(12) United States Patent
Yamagishi

(10) Patent No.: US 10,306,272 B2
(45) Date of Patent: May 28, 2019

(54) CONTENT SUPPLY DEVICE, CONTENT SUPPLY METHOD, PROGRAM, TERMINAL DEVICE, AND CONTENT SUPPLY SYSTEM

(71) Applicant: SATURN LICENSING LLC, New York, NY (US)

(72) Inventor: Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 76 days.

(21) Appl. No.: 14/895,582

(22) PCT Filed: Jun. 6, 2014

(86) PCT No.: PCT/JP2014/065052
§ 371 (c)(1),
(2) Date: Dec. 3, 2015

(87) PCT Pub. No.: WO2014/203745
PCT Pub. Date: Dec. 24, 2014

(65) Prior Publication Data
US 2016/0134901 A1    May 12, 2016

(30) Foreign Application Priority Data

Jun. 18, 2013 (JP) .................................. 2013-127408

(51) Int. Cl.
*H04N 21/24* (2011.01)
*H04N 21/61* (2011.01)
(Continued)

(52) U.S. Cl.
CPC ....... *H04N 21/226* (2013.01); *H04N 21/2265* (2013.01); *H04N 21/24* (2013.01);
(Continued)

(58) Field of Classification Search
CPC ............. H04N 21/23439; H04N 19/30; H04N 21/6125; H04N 21/226; H04N 21/632;
(Continued)

(56) References Cited

U.S. PATENT DOCUMENTS

2008/0201484 A1    8/2008 Sano et al.
2013/0111028 A1    5/2013 Kondrad et al.
(Continued)

OTHER PUBLICATIONS

Extended European Search Report dated Dec. 7, 2016 in Patent Application No. 14814325.8.
(Continued)

*Primary Examiner* — Benjamin R Bruckart
*Assistant Examiner* — Aklil M Tesfaye
(74) *Attorney, Agent, or Firm* — Oblon, McClelland, Maier & Neustadt, L.L.P.

(57) ABSTRACT

The present disclosure relates to a content supply device, a content supply method, a program, a terminal device, and a content supply system that make it possible to receive streaming data from an origin server having the shortest communication distance. According to a first aspect of the present disclosure, there is provided a content supply device that supplies a plurality of pieces of streaming data that include content of a same subject and differ in attribute, according to an adaptive streaming technique, the content supply device including: a metafile generating unit configured to generate a metafile that is for a reception side to select a supply source of the streaming data and that describes region identification information of the supply source; and a delivering unit configured to deliver the streaming data to the reception side as the supply source via a network, according to a request from the reception side based on the metafile. The present disclosure can be applied to a system in which content is delivered in a streaming manner.

11 Claims, 7 Drawing Sheets

(51) Int. Cl.
*H04N 21/63* (2011.01)
*H04N 21/84* (2011.01)
*H04N 21/226* (2011.01)
*H04N 21/462* (2011.01)
*H04N 21/643* (2011.01)
*H04N 21/845* (2011.01)
*H04N 21/6332* (2011.01)

(52) U.S. Cl.
CPC ..... *H04N 21/4622* (2013.01); *H04N 21/6125* (2013.01); *H04N 21/632* (2013.01); *H04N 21/6332* (2013.01); *H04N 21/64322* (2013.01); *H04N 21/84* (2013.01); *H04N 21/8456* (2013.01)

(58) Field of Classification Search
CPC ............... H04N 21/4622; H04N 21/24; H04N 21/2265; H04N 21/8456; H04N 21/84; H04N 21/64322; H04N 21/6332
See application file for complete search history.

(56) References Cited

U.S. PATENT DOCUMENTS

| | | | |
|---|---|---|---|
| 2013/0117413 A1* | 5/2013 | Kaneko | H04N 21/438 709/217 |
| 2014/0156865 A1* | 6/2014 | Giladi | H04L 65/4084 709/231 |
| 2014/0250230 A1* | 9/2014 | Brueck | H04L 65/607 709/226 |
| 2015/0012956 A1* | 1/2015 | Kim | H04N 21/2381 725/110 |

OTHER PUBLICATIONS

Mitsuhiro Hirabayashi, "Achieving Uninterrupted Video Streaming Using Existing Web Servers", Nikkei Electronics, 2012, pp. 77-85.

* cited by examiner

FIG. 3

```
<MPD ......>
<Period ......>
<AdaptationSet>
<Representation ......>
   ......
   <BaseURL>http://example.com/counter-10mn_avc_dash.mp4</BaseURL>
   <SegmentList ......>
   ......
   <SegmentURL mediaRange="795-83596"/>
   <SegmentURL mediaRange="83597-166046"/>
   <SegmentURL mediaRange="166047-248857"/>
   <SegmentURL mediaRange="248858-331477"/>
   ..........
</MPD>
```

FIG. 4

```
<MPD...originLocation="35d39'30.45"N,139d44'43.04"E"
...
</MPD>
```

US 10,306,272 B2

CONTENT SUPPLY DEVICE, CONTENT SUPPLY METHOD, PROGRAM, TERMINAL DEVICE, AND CONTENT SUPPLY SYSTEM

TECHNICAL FIELD

The present disclosure relates to a content supply device, a content supply method, a program, a terminal device, and a content supply system, and more particularly, to a content supply device, a content supply method, a program, a terminal device, and a content supply system, which are capable of efficiently receiving HTTP-delivered content.

BACKGROUND ART

Moving Picture Experts Group-Dynamic Adaptive Streaming over HTTP (hereinafter, referred to as "DASH") (MPEG-DASH) using the same HTTP as browsing of a web site as an internationally standardized moving image delivery protocol available for moving image delivery via the Internet has been known (for example, see Non-Patent Literature 1).

DASH implements adaptive streaming technology. In other words, a content supply side is configured to prepare a plurality of streams in which content of the same subject is included, and an image quality, an angle of view size, or the like changes according to a communication environment of the Internet serving as a delivery path or a capability or a state of a reception side. On the other hand, the reception side can select an optimal stream among the plurality of streams prepared by the supply side according to the communication environment of the Internet, the decoding capability of the reception side, or the like and acquire and reproduce the selected optimal stream.

As described above, in the DASH, a metafile called a media presentation description (MPD) is delivered from the supply side to the reception side so that the reception side can adaptively select and acquire a stream.

An address (url information) of a supply source of streaming data (media data such as audio/video/subtitle) of content divided into chunks is described in the MPD. The reception side can access a server serving as a content supply source based on the url information, requests streaming data, and receives and reproduce streaming data HTTP-delivered according to the request.

In practice, the streaming data and the MPD are delivered to the reception side via a content delivery network (CDN) using the Internet.

FIG. 1 illustrates an example of a configuration of a content supply system that delivers content in a streaming manner based on the DASH.

A content supply system 10 includes a content supply device 20 of a side at which content is supplied and a plurality of DASH clients 30 of a side at which content is received. The DASH clients 30 are connected to the content supply device 20 via a CDN 12 using the Internet 11.

The content supply device 20 delivers content of the same subject through a plurality of streams having different bit rates. The content supply device 20 includes a content management server 21, a DASH segment streamer 22, and a DASH MPD server 23.

The content management server 21 manages content supplied to the DASH clients 30, generates a plurality of pieces of streaming data having different bit rates from content of the same subject, and outputs the generated streaming data to the DASH segment streamer 22.

The DASH segment streamer 22 temporally divides each piece of streaming data into segments, holds each of the segments as a file, and notifies the DASH MPD server 23 of an address of a supply source of the files. Further, the DASH segment streamer 22 HTTP-delivers the file of the segmented streaming data via the CDN 12 in response to a request (an HTTP request) from the DASH client 30 of the reception side as an HTTP server.

The DASH MPD server 23 generates an MPD in which, for example, an address indicating a supply source of files of (segments of) a plurality of pieces of streaming data is described, and HTTP-delivers the generated MPD via the CDN 12 according to the request (the HTTP request) from the DASH clients 30 of the reception side.

The DASH client 30 requests the DASH MPD server 23 to transmit the MPD, request the DASH segment streamer 22 to transmit the streaming data based on the MPD HTTP-delivered according to the request, and receive and reproduce the file HTTP-delivered according to the request.

A plurality of cache servers (not illustrated) that temporarily hold the MPD or the segment of the streaming data which is HTTP-delivered are provided on the CDN 12, and when the MPD or the segment that is held in advance is requested by the DASH client 30, the cache servers can HTTP-deliver the MPD or the segment held therein instead of the DASH MPD server 23 or the DASH segment streamer 22. In the CDN 12, since the cache servers are provided, the MPD or the segment can be efficiently HTTP-delivered to the plurality of DASH clients 30.

Hereinafter, an HTTP server (the DASH segment streamer 22) that HTTP-delivers the segment of the streaming data in direct response to the request from the DASH clients 30 is referred to as an origin server.

CITATION LIST

Non-Patent Literature

Non-Patent Literature 1: Mitsuhiro Hirabayashi, "Achieving Uninterrupted Video Streaming Using Existing Web Servers," NIKKEI ELECTRONICS, Mar. 19, 2012

SUMMARY OF INVENTION

Technical Problem

When a communication distance between the DASH client 30 that has transmitted the HTTP request and the origin server is exceedingly large, even if the cache server located between the DASH client 30 and the origin server holds the segment or the like, its validity may expire (a holding time exceeds a predetermined period of time), and the cache servers may not function effectively.

Here, the communication distance refers to a value that is defined by the number of hops indicating the number of relay facilities such as the cache servers located between transmission and reception and correlates to a communication time.

In this case, the DASH client 30 receives HTTP delivery from the origin server rather than the cache server each time, and since it takes time to acquire a segment, the performance of stream reproduction remarkably deteriorates.

Thus, when streaming data desired to be received is supplied from a plurality of origin servers that differ in the communication distance from the DASH clients 30, it is desirable to request (to transmit an HTTP request to) the origin server located at the shortest communication distance to transmit the segment.

However, in the MPD of the related art, a URL of the origin server can be described, but information related to the communication distance is not described. Thus, it was not possible for the DASH client 30 side to select the origin server at the shortest communication distance and transmit the HTTP request.

The present disclosure was made in light of the foregoing, and aims at enabling streaming data to be received from an origin server having the shortest communication distance.

Solution to Problem

According to a first aspect of the present disclosure, there is provided a content supply device that supplies a plurality of pieces of streaming data that include content of a same subject and differ in attribute, according to an adaptive streaming technique, the content supply device including: a metafile generating unit configured to generate a metafile that is for a reception side to select a supply source of the streaming data and that describes region identification information of the supply source; and a delivering unit configured to deliver the streaming data to the reception side as the supply source via a network, according to a request from the reception side based on the metafile.

The metafile generating unit can generate an extended MPD as the metafile.

The metafile generating unit can generate the MPD in which MPD/@originLocation attribute for describing the region identification information is introduced as the metafile.

The content supply device according to the first aspect of the present disclosure can further include: a collecting unit configured to collect a plurality of pieces of the metadata each corresponding to a plurality of different supply sources, and to supply the metadata corresponding to the supply source having a shortest communication distance from the reception side, to the reception side.

The content supply device according to the first aspect of the present disclosure can further include: a communication distance managing unit configured to notify the collecting unit of the communication distance between the supply source and the reception side.

The communication distance managing unit can decide the communication distance between the supply source and the reception side based on at least one of relay facilities on the network and a communication load state of the network.

According to the first aspect of the present disclosure, there is provided a content supply method of a content supply device that supplies a plurality of pieces of streaming data that include content of a same subject and differ in attribute, according to an adaptive streaming technique, the content supply method including: a metafile generation step of generating, by the content supply device, a metafile that is for a reception side to select a supply source of the streaming data and that describes region identification information of the supply source; and a delivery step of delivering, by the content supply device, the streaming data to the reception side as the supply source via a network, according to a request from the reception side based on the metafile.

According to the first aspect of the present disclosure, there is provided a program causing a computer that supplies a plurality of pieces of streaming data that include content of a same subject and differ in attribute, according to an adaptive streaming technique to function as: a metafile generating unit configured to generate a metafile that is for a reception side to select a supply source of the streaming data and that describes region identification information of the supply source; and a delivering unit configured to deliver the streaming data to the reception side as the supply source via a network, according to a request from the reception side based on the metafile.

In the first aspect of the present disclosure, a metafile that is for a reception side to select a supply source of the streaming data and that describes region identification information of the supply source is generated, and the streaming data is delivered from the supply source to the reception side via a network, according to a request from the reception side based on the metafile.

According to a second aspect of the present disclosure, there is provided a terminal device configured to receive streaming data delivered from a content supply device that supplies a plurality of pieces of streaming data that include content of a same subject and differ in attribute, according to an adaptive streaming technique. The content supply device includes a metafile generating unit configured to generate a metafile that is for a reception side to select a supply source of the streaming data and that describes region identification information of the supply source, and a delivering unit configured to deliver the streaming data to the reception side as the supply source via a network, according to a request from the reception side based on the metafile. The terminal device is configured to request the streaming data from the supply source and to receive and reproduce the streaming data delivered in response to the request, based on the metafile.

In the second aspect of the present disclosure, the streaming data is requested from the supply source and the streaming data delivered in response to the request is received and reproduced, based on the metafile.

According to a third aspect of the present disclosure, there is provided a content supply system having a content supply device that supplies a plurality of pieces of streaming data that include content of a same subject and differ in attribute, according to an adaptive streaming technique, and a terminal device configured to receive the streaming data, the content supply device including: a metafile generating unit configured to generate a metafile that is for a reception side to select a supply source of the streaming data and that describes region identification information of the supply source, and a delivering unit configured to deliver the streaming data to the reception side as the supply source via a network, according to a request from the reception side based on the metafile. The terminal device is configured to request the streaming data from the supply source and to receive and reproduce the streaming data delivered in response to the request, based on the metafile.

In the third aspect of the present disclosure, the content supply device generates a metafile that is for a reception side to select a supply source of the streaming data and that describes region identification information of the supply source, and delivers the streaming data to the reception side as the supply source via a network, according to a request from the reception side based on the metafile. The terminal device requests the streaming data from the supply source, and receives and reproduces the streaming data delivered in response to the request, based on the metafile.

Advantageous Effects of Invention

According to the first to third aspects of the present disclosure, it is possible to receive streaming data from an origin server having shortened communication distance.

BRIEF DESCRIPTION OF DRAWINGS

FIG. 3 is a diagram illustrating an example in which an MPD is described in an XML format.

FIG. 4 is a diagram illustrating an example in which an extended MPD is described in an XML format.

DESCRIPTION OF EMBODIMENTS

Hereinafter, preferred modes (hereinafter referred to as embodiments) for carrying out the present disclosure will be described in detail.

[Exemplary Configuration of Content Supply System]

Figure 1:
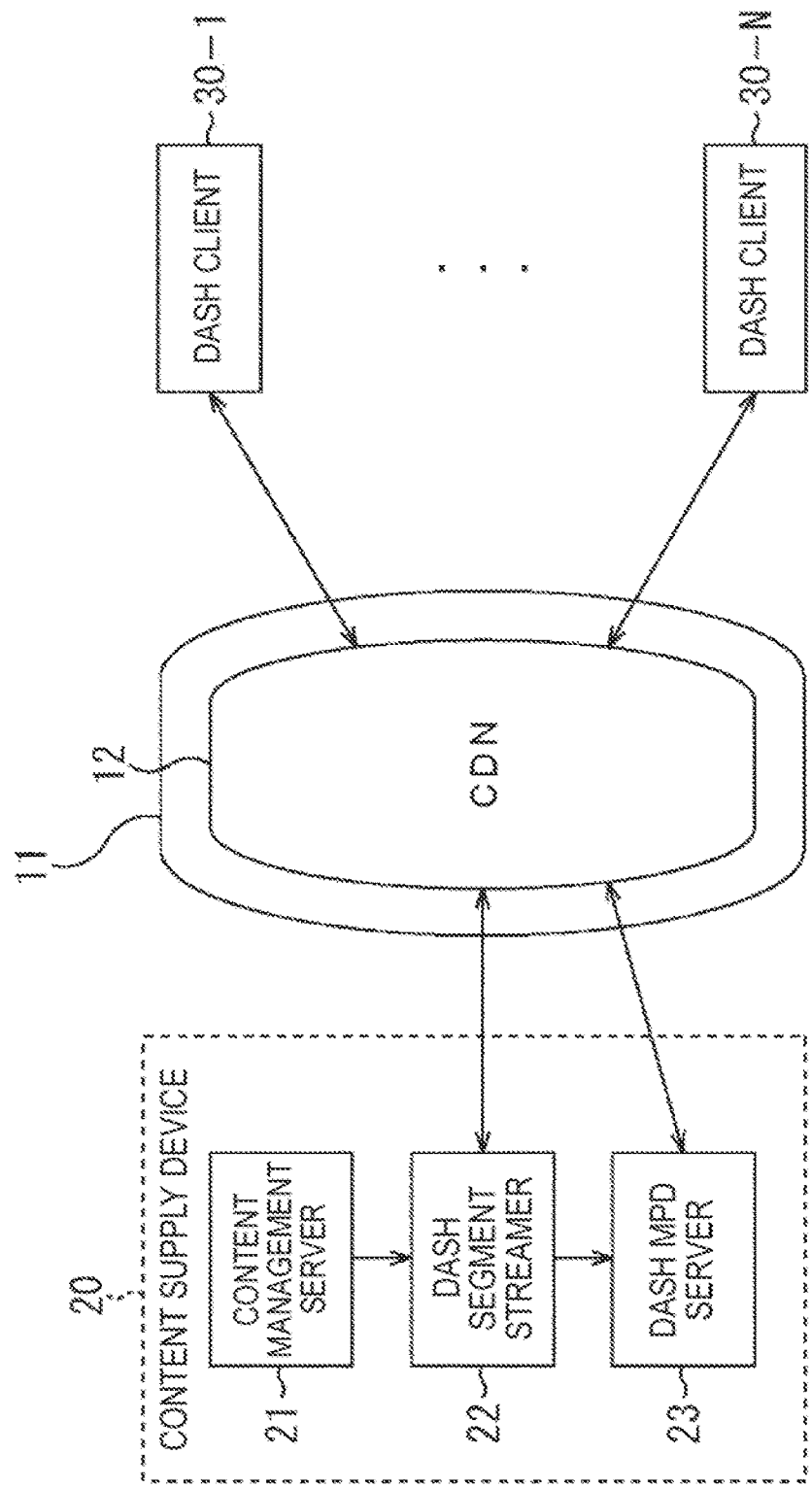
FIG. 1 is a block diagram illustrating an example of a configuration of a content supply system of the related art.
Figure 2:
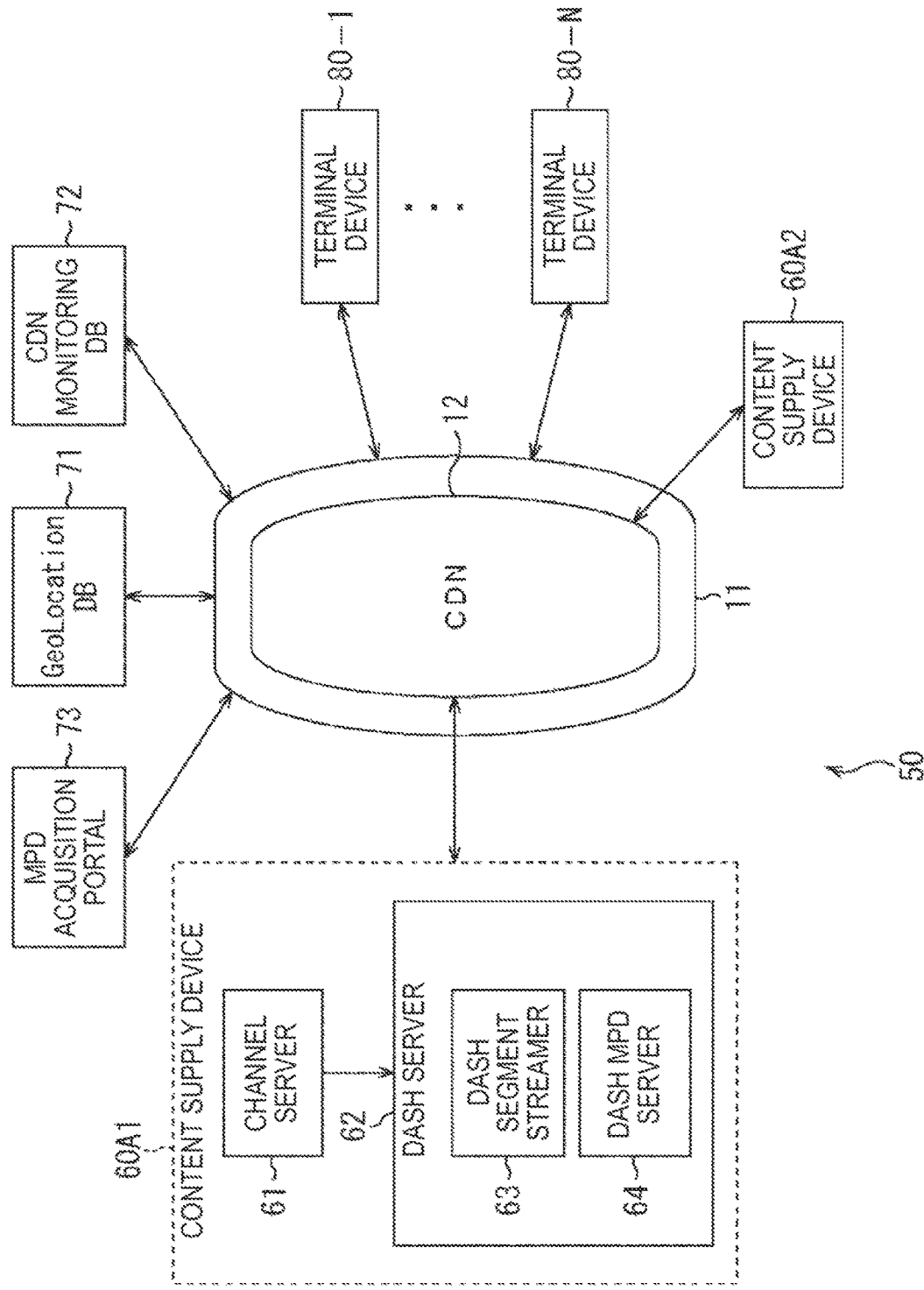
FIG. 2 is a block diagram illustrating an exemplary configuration of a content supply system to which the present disclosure is applied.

FIG. 2 illustrates an exemplary configuration of a content supply system according to an embodiment of the present disclosure.

The content supply system 50 includes content supply devices 60A1 and 60A2, a GeoLocation database (DB) 71, a CDN monitoring database (DB) 72, an MPD acquisition portal 73, and a plurality of terminal devices 80 which are connected to one another via the Internet 11.

Further, there is the CDN 12 on the Internet 11, and a plurality of cache servers (not illustrated) are provided on the CDN 12.

The content supply device 60A1 delivers a plurality of pieces of streaming data having different bit rates corresponding to content of the same subject through a channel A. The content supply device 60A2 delivers a plurality of pieces of streaming data having different bit rates corresponding to the same content as in the content supply device 60A1 through the channel A. In addition to the content supply device 60A2, there may be many content supply devices that deliver a plurality of pieces of streaming data having different bit rates corresponding to the same content as in the content supply device 60A1.

However, it is assumed the content supply device 60A1 and the content supply device 60A2 are installed at geographically discrete positions and differ in communication distance from a certain terminal device 80.

Here, the content supply device 60A1 and the content supply device 60A2 are referred to simply as a content supply device 60 when it is unnecessary to distinguish the content supply devices 60A1 and 60A2 from each other.

The content supply device 60 includes a channel server 61 and a DASH server 62.

The channel server 61 manages source data of content to be delivered through the channel A, generates a plurality of pieces of streaming data having different bit rates from the source data of the same subject, and supplies the generated streaming data to the DASH server 62.

The DASH server 62 includes a DASH segment streamer 63 and a DASH MPD server 64.

The DASH segment streamer 63 temporally delimits each piece of streaming data into periods, divides each period into segments, and holds each segment or several segments as a file. The DASH segment streamer 63 notifies the DASH MPD server 64 of an address (URL information) serving as a supply source of the held files. In addition, the DASH segment streamer 63 HTTP-delivers the files of the segmented streaming data via the CDN 12 according to a request (the HTTP request) from the terminal device 80. Further, the DASH segment streamer 63 notifies the Geo-Location database 71 of an IP address of the DASH segment streamer 63 serving as the origin server, acquires the region identification information identifying a region in which the DASH segment streamer 63 is installed, and notifies the DASH MPD server 64 of the acquired region identification information.

The DASH MPD server 64 generates an MPD (hereinafter referred to as an extended MPD; details will be described later) that is extended and necessary when the terminal device 80 side receives the segment of the streaming data. The DASH MPD server 64 supplies the extended MPD to the MPD acquisition portal 73 according to crawling by the MPD acquisition portal 73.

The GeoLocation database 71 stores an IP address and the region identification information of a server allocated an IP address in the form of a database, and transmits the corresponding region identification information according to the IP address notified of by the DASH segment streamer 63 or the MPD acquisition portal 73. For example, a latitude and a longitude, a country name and a zip code, etc., or a country name and a municipality, etc. may be used as the region identification information.

The CDN monitoring database 72 manages statistical information of relay facilities such as the cache servers provided on the CDN 12, a communication load state, or the like, and transmits the communication distances of the terminal device 80 and the origin server according to the notification of the region identification information of the terminal device 80 and the origin server form the MPD acquisition portal 73.

The MPD acquisition portal 73 collects the extended MPDs from the content supply devices 60 of designated channels according to an MPD acquisition request using a query API from the terminal device 80.

An exemplary query API from the terminal device 80 is as follows:

http://mpdPortal.com/minDistanceMPD?channelId="BBC-One"

Here, http://mpdPortal.com/minDistanceMPD specifies a server side script on the MPD acquisition portal 73, and BBC-One indicates a designated channel.

The MPD acquisition portal 73 notifies the GeoLocation database 71 of the IP address of the terminal device 80 that has transmitted the MPD acquisition request, and acquires the region identification information of the terminal device 80. Further, the MPD acquisition portal 73 notifies the CDN monitoring database 72 of the region identification information of the origin server described in each extended MPD and the region identification information of the terminal device 80, acquires the communication distances of the origin server and the terminal device 80, and transmits the extended MPD corresponding to the shortest communication distance to the terminal device 80.

The terminal device 80 requests the DASH segment streamer 63 having the shortest communication distance to transmit the segment of the streaming data based on the acquired extended MPD, and receives and reproduces the file HTTP-delivered according to the request.

[Extension of MPD]

Next, the MPD in the DASH and an extension thereof will be described.

In the MPD, information related to content (Media) is described being divided into units of periods. In each period, a plurality of representations including information related to streaming data of the same subject that differs in image quality or an angle of view size and differs in a stream attribute such as a bit rate are prepared. The representation stores information related to a segment obtained by further temporally dividing a period.

FIG. 3 illustrates an example in which a structure below the representation of the MPD is described in an XML format.

In FIG. 8, "http://example.com/counter-10 mn_avc_dash.mp4" described in MPD/Period/AdaptationSet/Representation/BaseURL indicates the address of the supply source of the file into which a plurality of segments are collectively converted.

MPD/Period/AdaptationSet/Representation/SegmentList/SegmentURL/@mediaRange indicates a byte range of the streaming data corresponding to each segment in the file.

For example, MPD/Period/AdaptationSet/Representation/SegmentList/SegmentURL/@mediaRange="795-83596" indicates that the byte range of a 795th byte to an 83596th byte in the file is streaming data corresponding to a first segment.

Thus, when the terminal device 40 acquires first segmented streaming data, it is desirable to designate the mediaRange "795-83596" to a range header together with a url "http://example.com/counter-10 mn_avc_dash.mp4" of the file and issue an HTTP request. At this time, the HTTP request is specifically as follows:

GET/counter-10 mn_avc_dash.mp4 HTTP/1.1
Host: example.com
Range: bytes=795-83596

Next, FIG. 4 illustrates an example in which a structure below an MPD value of the extended MPD by which the region identification information of the origin server can be described in the MPD is described in an XML format.

In other words, in the extended MPD, an MPD/@originLocation attribute is newly introduced immediately below the MPD.

The region identification information obtained from the GeoLocation database 71 is described in the MPD/@originLocation attribute. "35d39'30.45"N, 139d44'43.04"'E" in FIG. 4 is a description example when the latitude and the longitude are employed as the region identification information, and indicates that the origin server is located at a latitude of 35 degrees 39 minutes and 30.45 seconds north and a longitude of 139 degrees 44 minutes and 43.04 seconds east.

For example, when a country name and a zip code are employed as the region identification information, it is desirable to describe, for example, in a form such as "jpn.2300075." This indicates that the origin server is located in a region having a zip code 230-0075 in Japan.

[Operation of Content Supply System 50]

Next, an operation of the content supply system 50 will be described.

Figure 5:
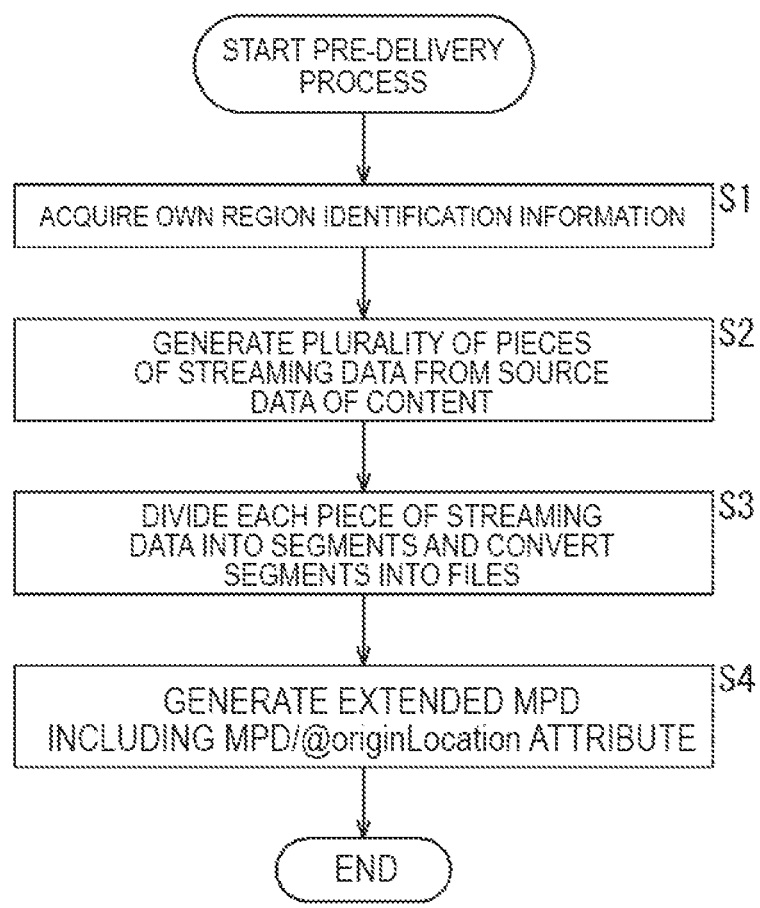
FIG. 5 is a flowchart for describing a pre-delivery process.

FIG. 5 is a flowchart for describing a process (hereinafter, a pre-delivery process) that is performed by the content supply device 60 in advance in order to deliver content.

In step S1, the DASH segment streamer 63 of each content supply device 60 notifies the GeoLocation database 71 of its own IP address as the origin server, acquires its own region identification information, and notifies the DASH MPD server 64 of the acquired region identification information.

In step S2, the channel server 61 generates a plurality of pieces of streaming data having different bit rates from source data of content to be delivered through the channel A, and supplies the generated streaming data to the DASH server 62.

In step S3, the DASH segment streamer 63 temporally delimits each streaming data into periods, divides each period into segments, and holds each segment or several segments as a file. Further, the DASH segment streamer 63 notifies the DASH MPD server 64 of an address serving as a supply source of the held files.

In step S4, the DASH MPD server 64 generates the extended MPD describing the region identification information of the origin server (the DASH segment streamer 63) acquired from the GeoLocation database 71 in step S1, the address of the supply source of the segment, and the like, which is necessary when the terminal device 80 side receives the segment of the streaming data. The description of the pre-delivery process is now finished.

Figure 6:
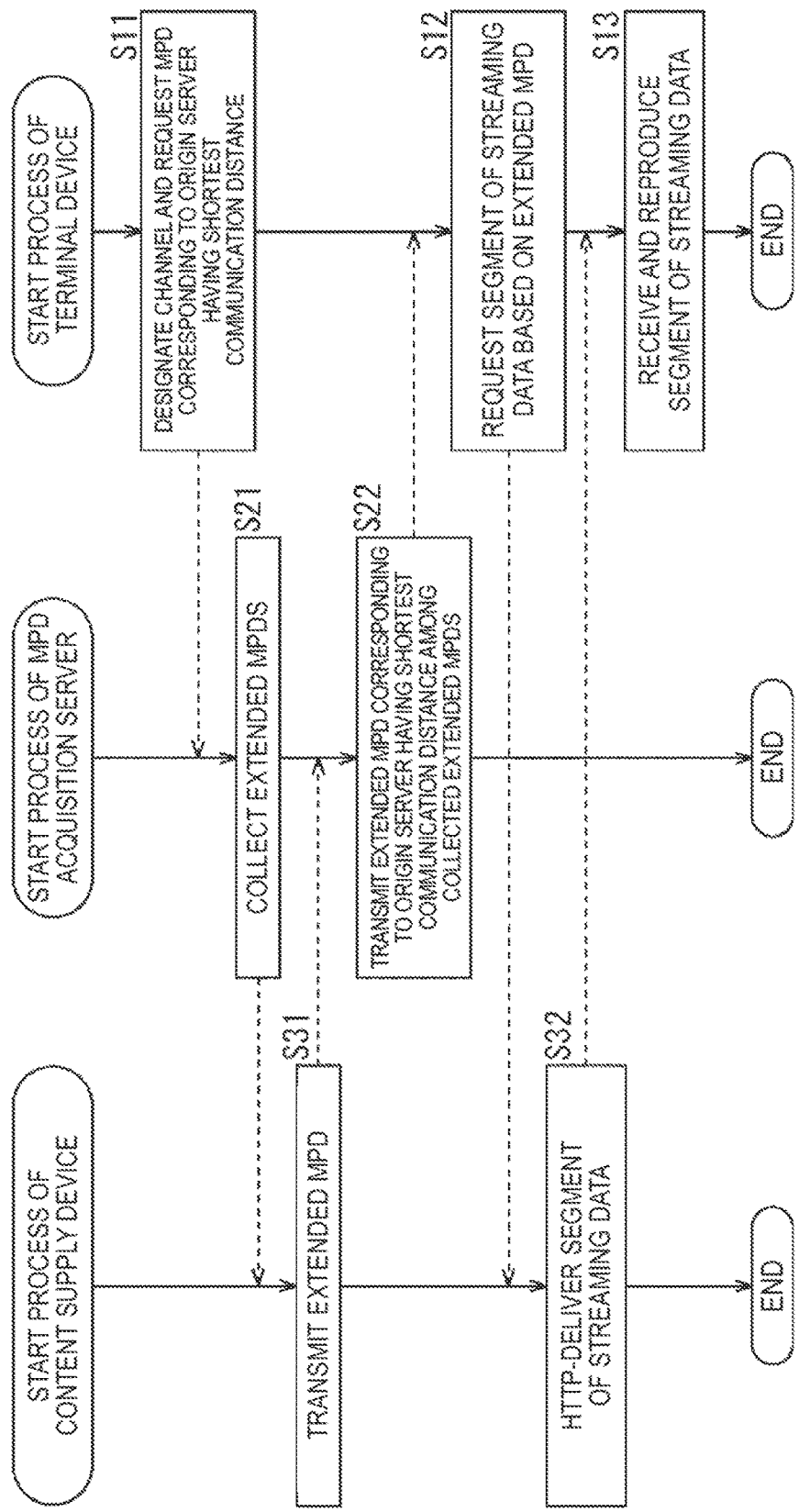
FIG. 6 is a flowchart for describing a series of processes of a content supply system.
Figure 7:
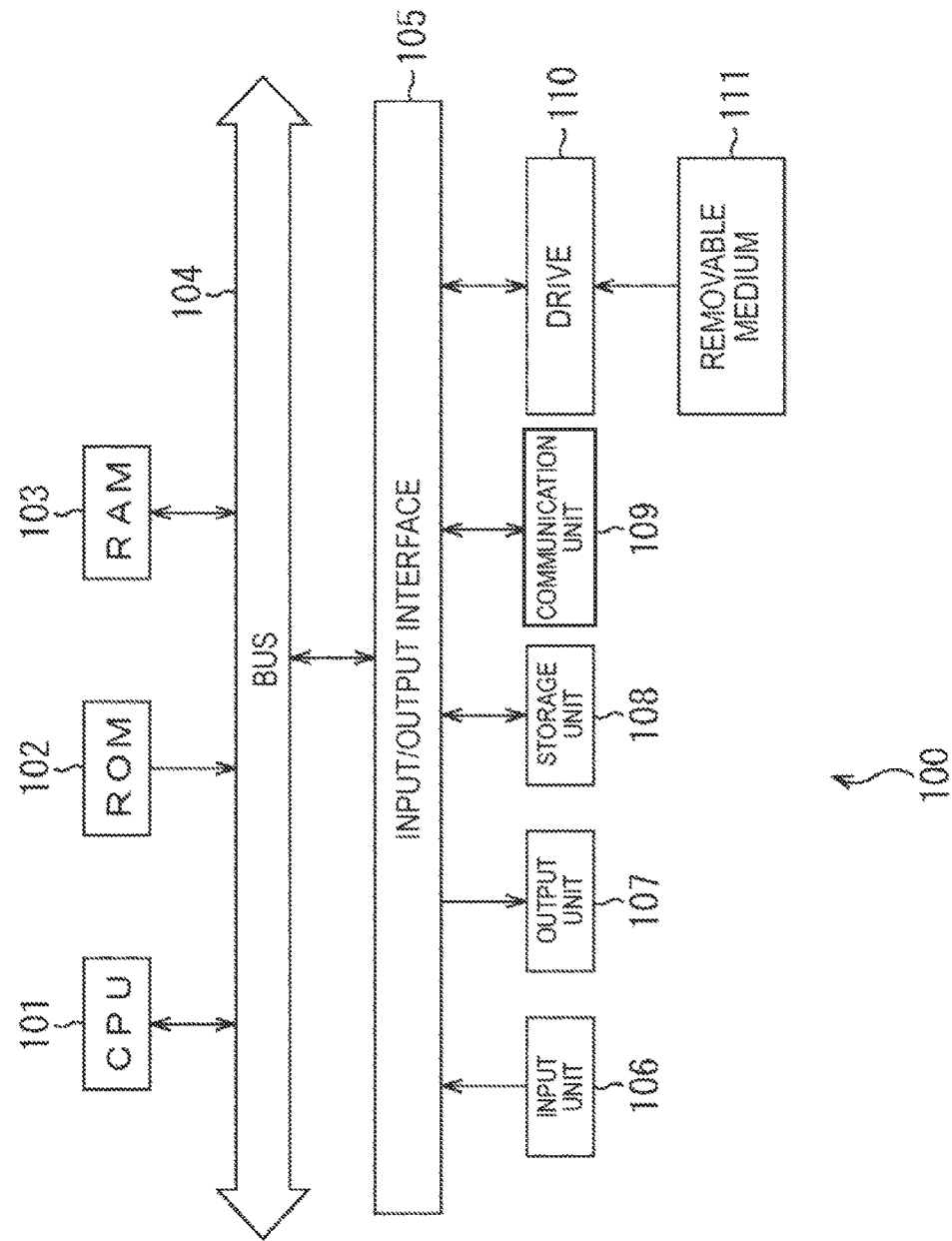
FIG. 7 is a block diagram illustrating an exemplary configuration of a computer.

Next, FIG. 6 is a flowchart for describing a series of processes until the terminal device 80 acquires the extended MPD, and then receives and reproduces the streaming data of content from the origin server having the shortest communication distance (hereinafter referred to as series of processes).

In step S11, the terminal device 80 requests the MPD acquisition portal 73 to transmit the extended MPD that corresponds to a channel selected by the user and corresponds to the origin server having the shortest communication distance. In other words, the terminal device 80 transmits the query API for requesting crawling of the extended MPD to the MPD acquisition portal 73.

In step S21, the MPD acquisition portal 73 requests the DASH MPD server 64 of each content supply device 60 of the channel designated by the query API to transmit the extended MPD in response to the query API. Further, the MPD acquisition portal 73 notifies the GeoLocation database 71 of the IP address of the terminal device 80 that has transmitted the MPD acquisition request, and acquires the region identification information of the terminal device 80.

In step S31, the DASH MPD server 64 of each content supply device 60 that has been requested to transmit the extended MPD HTTP-delivers the extended MPD to the MPD acquisition portal 73.

In step S22, the MPD acquisition portal 73 receives the HTTP-delivered extended MPD, and reads the region identification information of the origin server described in the MPD/@originLocation attribute of each extended MPD. Further, the MPD acquisition portal 73 notifies the CDN monitoring database 72 of the region identification information of each origin server and the terminal device 80, acquires the communication distances of the origin server and the terminal device 80, and transmits the extended MPD corresponding to the origin server having the shortest communication distance among the collected extended MPDs to the terminal device 80.

In step S12, the terminal device 80 receives the extended MPD corresponding to the origin server having the shortest communication distance, and requests the DASH segment streamer 63 serving as the origin server having the shortest communication distance to transmit the segment of the streaming data for zapping based on the extended MPD. In step S32, the DASH segment streamer 63 HTTP-delivers the requested segment according to this request. In step S13, the terminal device 80 receives and reproduces the segment of the HTTP-delivered streaming data. The description of the series of processes is now finished.

According to the series of processes described above, the terminal device 80 can request the origin server having the shortest communication distance among a plurality of origin servers of the same channel to transmit the streaming data. Thus, when the segment of the streaming data delivered directly from the origin server is received, the segment of the streaming data can be received rapidly, and even when the segment delivered from the cache servers in the middle of the path is received, data that is cached can be efficiently used. Thus, it is possible to prevent the occurrence of a situation in which the performance of reception and reproduction of the streaming data deteriorates.

By the way, each of the content supply device 60 and the terminal device 80 that execute a series of processes described above can be configured with hardware or can be implemented by executing software through a computer. Examples of the computer include a computer embedded in dedicated hardware and a general-purpose personal computer capable of installing various kinds of programs and executing various kinds of functions.

FIG. 6 is a block diagram illustrating an exemplary hardware configuration of the computer.

In a computer 100, a central processing unit (CPU) 101, a read only memory (ROM) 102, and a random access memory (RAM) 103 are connected with one another via a bus 104.

An input/output interface 105 is connected to the bus 104. An input unit 106, an output unit 107, a storage unit 108, a communication unit 109, and a drive 110 are connected to the input/output interface 105.

The input unit 106 includes a keyboard, a mouse, a microphone, and the like. The output unit 107 includes a display, a speaker, and the like. The storage unit 108 includes a hard disk, a non-volatile memory, and the like. The communication unit 109 includes a network interface. The drive 110 drives a removable medium 111 such as a magnetic disk, an optical disk, a magneto-optical disk, or a semiconductor memory.

In the computer 100 having the above-described configuration, for example, a series of processes described above are performed by loading a program stored in the storage unit 108 onto the RAM 103 through the input/output interface 105 and the bus 104 and executing the loaded program through the CPU 101.

For example, the program executed by the computer 100 (the CPU 101) may be recorded in the removable medium 111 serving as a package medium or the like and provided. The program may be provided via a wired or wireless transmission medium such as a local area network, the Internet, or digital satellite broadcasting.

In the computer 100, the removable medium 111 may be mounted on the drive 110, and the program may be installed in the storage unit 108 through the input/output interface 105. The program may be received by the communication unit 109 via a wired or wireless transmission medium and installed in the storage unit 108. Moreover, the program may be installed in the ROM 102 or the storage unit 108 in advance.

Further, the program executed by the computer 100 may be a program in which a process is chronologically performed according to the sequence described in the present specification or may be a program in which a process is performed in parallel or at a necessary timing, for example, when calling is performed.

An embodiment of the present disclosure is not limited to the above embodiments, and various changes can be made within the scope not departing from the gist of the present disclosure.

Additionally, the present technology may also be configured as below.

(1)

A content supply device that supplies a plurality of pieces of streaming data that include content of a same subject and differ in attribute, according to an adaptive streaming technique, the content supply device including:

a metafile generating unit configured to generate a metafile that is for a reception side to select a supply source of the streaming data and that describes region identification information of the supply source; and a delivering unit configured to deliver the streaming data to the reception side as the supply source via a network, according to a request from the reception side based on the metafile.

(2)

The content supply device according to (1), wherein the metafile generating unit generates an extended MPD as the metafile.

(3)

The content supply device according to (1) or (2), wherein the metafile generating unit generates the MPD in which MPD/@originLocation attribute for describing the region identification information is introduced as the metafile.

(4)

The content supply device according to any of (1) to (3), further including:

a collecting unit configured to collect a plurality of pieces of the metadata each corresponding to a plurality of different supply sources, and to supply the metadata corresponding to the supply source having a shortest communication distance from the reception side, to the reception side.

(5)

The content supply device according to (4), further including:

a communication distance managing unit configured to notify the collecting unit of the communication distance between the supply source and the reception side.

(6)

The content supply device according to (5), wherein the communication distance managing unit decides the communication distance between the supply source and the reception side based on at least one of relay facilities on the network and a communication load state of the network.

REFERENCE SIGNS LIST

11 Internet
12 CDN
50 content supply system
60 content supply device
61 channel server
62 DASH server
63 DASH segment streamer
64 DASH PD server
71 GeoLocation database
72 CDN monitoring database
73 MPD acquisition portal 80 terminal device
100 computer
101 CPU

The invention claimed is:

1. A content supply device that supplies a plurality of pieces of streaming data that include content of a same subject and differ in attribute, according to an adaptive streaming technique, the content supply device comprising:
circuitry configured to
generate a metafile describing geographic region identification information of a supply source of the streaming data, the metafile being for a reception side to receive the streaming data;
collect a plurality of the metafiles, each corresponding to one of a plurality of different supply sources, in response to a request from the reception side of the streaming data;
supply the metafile corresponding to the supply source having a shortest communication distance from the reception side among the collected metafiles to the reception side such that the geographic region identification information of the supply source having the shortest communication distance from the reception side is transmitted to the reception side, a communication distance of each of the plurality of supply sources being determined based at least in part on a communication load state of the network; and
deliver the streaming data to the reception side as the supply source via a network, according to a request from the reception side based on the supplied metafile.

2. The content supply device according to claim 1, wherein the circuitry is configured to generate an extended MPD as the metafile.

3. The content supply device according to claim 2, wherein the circuitry is configured to generate the MPD in which MPD/@originlocation attribute for describing the geographic region identification information is introduced as the metafile.

4. The content supply device according to claim 1, wherein the circuitry is further configured to manage statistical information related to communication in the network to decide the communication distance between the supply source and the reception side.

5. The content supply device according to claim 4, wherein the circuitry is configured to decide the communication distance between the supply source and the reception side based on its managed statistical information, the geographic region identification information of the supply source, and geographic region identification information of the reception side.

6. A content supply method that supplies a plurality of pieces of streaming data that include content of a same subject and differ in attribute, according to an adaptive streaming technique, the content supply method comprising:
generating, using circuitry, a metafile describing geographic region identification information of a supply source of the streaming data, the metafile being for a reception side to receive the streaming data;
collecting, using the circuitry, a plurality of the metafiles each corresponding to one of a plurality of different supply sources, in response to a request from the reception side of the streaming data;
supplying the metafile corresponding to the supply source having a shortest communication distance from the reception side among the collected metafiles to the reception side such that the geographic region identification information of the supply source having the shortest communication distance from the reception side is transmitted to the reception side, a communication distance of each of the plurality of supply sources being determined based at least in part on a communication load state of the network; and
delivering, using the circuitry, the streaming data to the reception side as the supply source via a network, according to a request from the reception side based on the supplied metafile.

7. A non-transitory, computer-readable storage medium storing a program causing a computer that supplies a plurality of pieces of streaming data that include content of a same subject and differ in attribute, according to an adaptive streaming technique, to
generate a metafile describing geographic region identification information of a supply source of the streaming data, the metafile being for a reception side to receive the streaming data;
collect a plurality of the metafiles each corresponding to one of a plurality of different supply sources, in response to a request from the reception side of the streaming data;
supply the metafile corresponding to the supply source having a shortest communication distance from the reception side among the collected metafiles to the reception side such that the geographic region identification information of the supply source having the shortest communication distance from the reception side is transmitted to the reception side, a communication distance of each of the plurality of supply sources being determined based at least in part on a communication load state of the network; and
deliver the streaming data to the reception side as the supply source via a network, according to a request from the reception side based on the supplied metafile.

8. A receiving device configured to receive streaming data delivered from a content supply device that supplies a plurality of pieces of streaming data that include content of a same subject and differ in attribute, according to an adaptive streaming technique, wherein the receiving device includes
circuitry configured to
request a metafile corresponding to a selected channel from a server,
receive the metafile for requesting the streaming data from a supply source specified in the metafile and the metafile describing geographic region identification information of the supply source such that the geographic region identification information of the supply source having a shortest communication distance from the receiving device is transmitted to the receiving device, wherein the supply source has the shortest communication distance to the receiving device among a plurality of supply sources according to an IP address of the receiving device, a communication distance of each of the plurality of supply sources being determined based at least in part on a communication load state of the network, and
receive the streaming data via the network based on the metafile, and
wherein the circuitry is configured to request the streaming data from the supply source and to reproduce the streaming data delivered in response to the request, based on the metafile.

9. The receiving device according to claim 8, wherein the circuitry is configured to receive an extended MPD as the metafile.

10. The receiving device according to claim 9,
wherein the circuitry is configured to receive the MPD in which MPD/@originlocation attribute for describing the geographic region identification information is introduced as the metafile.

11. A content supply system having a content supply device that supplies a plurality of pieces of streaming data that include content of a same subject and differ in attribute, according to an adaptive streaming technique, and a terminal device configured to receive the streaming data,
the content supply device comprising:
circuitry configured to
generate a metafile describing geographic region identification information of a supply source of the streaming, the metafile being for a reception side to receive the streaming data;
collect a plurality of the metafiles, each corresponding to one of a plurality of different supply sources, in response to a request from the reception side of the streaming data;
supply the metafile corresponding to the supply source having a shortest communication distance from the reception side among the collected metafiles to the reception side such that the geographic region identification information of the supply source having the shortest communication distance from the reception side is transmitted to the reception side, a communication distance of each of the plurality of supply sources being determined based at least in part on a communication load state of the network; and
deliver the streaming data to the reception side as the supply source via a network, according to a request from the reception side based on the metafile,
wherein the terminal device comprises circuitry configured to request the streaming data from the supply source and to receive and reproduce the streaming data delivered in response to the request, based on the metafile.

* * * * *